US012811844B2

(12) United States Patent
Cardell et al.

(10) Patent No.: US 12,811,844 B2
(45) Date of Patent: Nov. 24, 2026

(54) SELF-HEALING SYSTEMS, SWAPPABLE UNITS, AND ASSOCIATED CIRCUITRY, DEVICES, MOBILE UNITS, AND METHODS

(71) Applicant: LiveView Technologies, LLC, American Fork, UT (US)

(72) Inventors: Jason Cardell, Orem, UT (US); Jacob Crockett, Orem, UT (US); Jordan Smith, Orem, UT (US); Riley Hiatt, Orem, UT (US); Michael Gleason, Orem, UT (US); Previn Menon, Orem, UT (US)

(73) Assignee: LiveView Technologies, LLC, American Fork, UT (US)

( * ) Notice: Subject to any disclaimer, the term of this patent is extended or adjusted under 35 U.S.C. 154(b) by 373 days.

(21) Appl. No.: 18/415,350

(22) Filed: Jan. 17, 2024

(65) Prior Publication Data

US 2025/0233794 A1 Jul. 17, 2025

(51) Int. Cl.
*H04L 41/0659* (2022.01)
*H04L 12/12* (2006.01)
*H04N 7/18* (2006.01)

(52) U.S. Cl.
CPC .......... *H04L 41/0661* (2023.05); *H04L 12/12* (2013.01); *H04N 7/18* (2013.01)

(58) Field of Classification Search
CPC ........ H04L 41/0661; H04L 12/12; H04N 7/18
USPC .......................................................... 370/216
See application file for complete search history.

(56) References Cited

U.S. PATENT DOCUMENTS 10,171,999 B2 1/2019 Phillips et al.
2019/0104284 A1 * 4/2019 Phillips ................. E21B 47/008

FOREIGN PATENT DOCUMENTS

BE 1021882 B1 1/2016
WO WO-2018119488 A1 * 7/2018 ........... G08B 13/196

OTHER PUBLICATIONS

Invitation to Pay Additional Fees for International Application No. PCT/US24/36350, mailed Sep. 13, 2024, 2 pages.

(Continued)

*Primary Examiner* — Christopher R Crompton
(74) *Attorney, Agent, or Firm* — Ray Quinney & Nebeker

(57) ABSTRACT

Various embodiments relate to systems and devices including self-healing functionality. A system may include a mobile surveillance unit. The mobile surveillance unit may include a power source and a relay coupled to the power source. The mobile surveillance may further include a network including at least one network device coupled to the relay. Moreover, the mobile surveillance unit may include a controller coupled to the network. The controller may be configured to determine whether a network device of the at least one network device is in a non-operative state. The controller may also be configured to, responsive to determining that the network device is in the non-operative state, cause the relay to decouple the network device from the power source for a predetermined time period. Associated methods and mobile units, and swappable units, are also disclosed.

15 Claims, 15 Drawing Sheets

(56) References Cited

OTHER PUBLICATIONS

International Search Report for International Application No. PCT/US2024/036350, mailed Dec. 9, 2024, 4 pages.
International Written Opinion for International Application No. PCT/US2024/036350, mailed Dec. 9, 2024, 8 pages.
Xytronix Research and Design, Inc. "WebRelay Users Manual Revision 4.1", Nov. 6, 2021, pp. 1-81, Nov. 6, 2021, https://web.archive.org/web/20211106074326/, Oct. 18, 2024.

* cited by examiner

SELF-HEALING SYSTEMS, SWAPPABLE UNITS, AND ASSOCIATED CIRCUITRY, DEVICES, MOBILE UNITS, AND METHODS

TECHNICAL FIELD

This disclosure relates generally to self-healing devices and systems and, more specifically, to mobile units including self-healing functionality, and to related circuitry, devices, systems, mobile units, and methods. Other embodiments relate to a swappable unit including a number of internal components and configured to be coupled to a mobile unit.

BACKGROUND

An electronic device, such as a computer, a network device, a power generator, or the like, may malfunction and, thus, may need to be rebooted or reset via a reset/reboot button or by disconnecting and reconnecting ("toggling") power to the electronic device.

BRIEF SUMMARY

At least one embodiment of the disclosure includes a system including a mobile surveillance unit. The mobile surveillance unit may include a power source and a relay coupled to the power source. The mobile surveillance unit may also include a network including at least one network device coupled to the relay and a controller coupled to the network. The controller may be configured to determine whether a network device of the at least one network device is in a non-operative state. Further, responsive to determining that the network device is in the non-operative state, the controller may be configured to cause the relay to decouple the network device from the power source for a predetermined time period.

Another embodiment includes a method of operating a mobile surveillance unit. The method may include sensing, via a controller of a mobile surveillance unit, a state of a network device of the mobile surveillance unit. Moreover, responsive to determining that the network device is in a non-operative state, the method may include decoupling, via a relay, the network device from a power source of the mobile surveillance unit for a predetermined time period.

Other embodiments may include a mobile surveillance unit. The mobile surveillance unit may include a trailer and a power source coupled to the trailer. The mobile surveillance unit may also include a relay coupled to the power source and a network including at least one network device coupled to the relay. Further, the mobile surveillance unit may include a controller coupled to the network. The controller may be configured to determine a state of one or more network devices of the at least one network device. Furthermore, the controller may be configured to cause a switch of the relay to open such that a network device of the one or more network devices is decoupled from the power source responsive to determining that the network device is in a failed state.

In yet other embodiments, a mobile surveillance unit may include a trailer, a mast having a first end coupled to the trailer, a head unit coupled to a second end of the mast, and a storage box coupled to the trailer. The storage box may include at least one battery and a swappable unit including a plurality of internal components and a plurality of interface connections. A first interface connection of the plurality of interface connections may couple at least one internal component of the plurality of internal components to the at least one battery.

DETAILED DESCRIPTION

Figure 1:
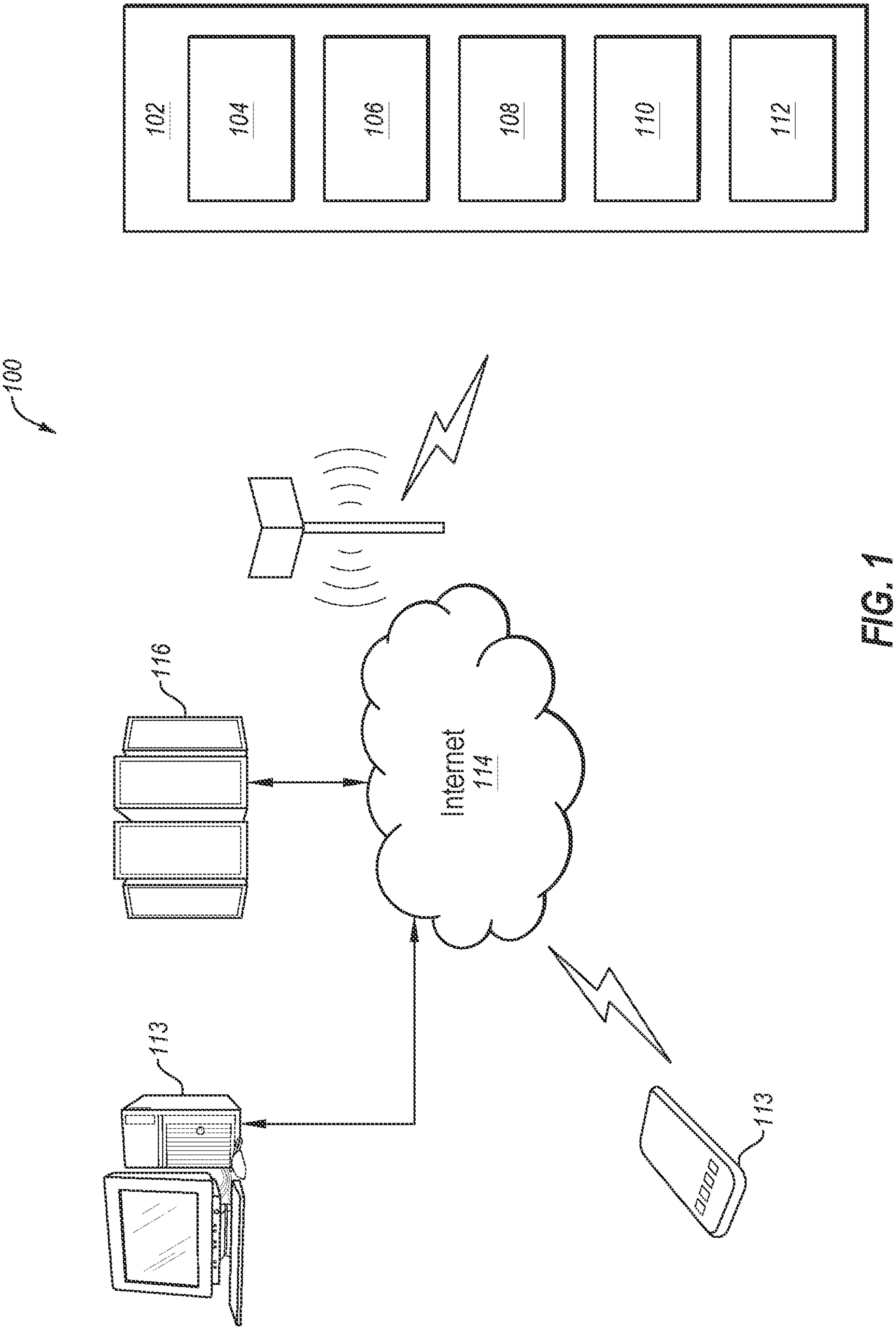
FIG. 1 depicts an example system including a mobile unit, in accordance with one or more embodiments of the disclosure.

Referring in general to the accompanying drawings, various embodiments of the present disclosure are illustrated to show example embodiments related to self-healing systems, swappable units, and associated circuits, mobile units, devices, systems, and methods. It should be understood that the drawings presented are not meant to be illustrative of actual views of any particular portion of an actual circuit, device, system, or structure, but are merely representations which are employed to more clearly depict various embodiments of the disclosure.

The following provides a more detailed description of the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

As will be appreciated, a device (e.g., an electronic device) may occasionally stop working (e.g., "freeze," "hang," or otherwise malfunction) and may need to be reset or rebooted by disconnecting and reconnecting (also referred to herein as "toggling") power to the device.

As will also be appreciated, in some systems, a device (e.g., a network device) of a mobile unit may be remote from other devices (e.g., a server and/or a user device) of the system and/or personnel (e.g., a technician or an administrator). As a more specific, non-limiting example, a remote unit (e.g., a "mobile unit" or "remote device"), which may include one or more input devices (e.g., sensors, cameras, etc.), one or more output devices (e.g., lights, speakers, etc.), one or more communication devices, a storage device, a controller, and/or a power generator may be positioned at a first location, and a server, a user device, and/or a technician may be positioned at one or more others locations, which may be remote from the first location.

In some conventional systems, when a device (e.g., a controller, a communication device, a power generator, or another device) of a remote unit (e.g., a mobile, remote unit) fails, a technician is dispatched from a location nearest to, but remote from, that of the remote unit. The technician, after traveling (e.g., via a vehicle) to and arriving at the location of the remote unit, manually disconnects power to the device. After a few seconds, the technician reconnects power to the device to reset the device. This is not only expensive but may take several days before the remote unit can be reached and the device is restored to full operation. As will be appreciated, downtime of a remote unit is very costly (e.g., to a business due to clients/customers not paying for associated products/services during downtime).

Various embodiments of the disclosure relate to self-healing systems and/or devices. More specifically, various embodiments relate to restoring operation of various components of a mobile unit. For example, a mobile surveillance unit, which may include a power source and a number of devices (e.g., network devices, such as communication devices, a power generator, and/or other devices), may be configured to detect (e.g., automatically) if a device is malfunctioning (e.g., is in a non-operative state), and if so, reset (e.g., automatically) the device via decoupling the device from a power source (i.e., temporarily) and recoupling the device to the power source (i.e., to reset and restore the device to an operative state).

According to various embodiments, circuitry, which may be relatively small, inexpensive, and/or simple, may be configured to disconnect a power source (e.g., a main power source as well as a backup power source) from a device (e.g., simultaneously and momentarily), to toggle power to the device and allow the device (and any other associated devices) to be reset, thereby eliminating the need for a technician to be dispatched to the remote location to manually perform a reset operation. As will be appreciated, after detecting (e.g., automatically) that a device of a remote unit is malfunctioning and/or has stopped working (e.g., the device is in a non-operative state), various embodiments disclosed herein may allow for the device to be restored (e.g., to full operation) in a relatively short time period (e.g., within a few seconds or minutes).

Accordingly, unlike conventional systems, devices, circuitry, and methods, which require a user to travel (e.g., via a vehicle) to a remote location of a mobile unit to manually reset a device of the mobile unit, various embodiments may enable a device (e.g., a network device, such as a communication device or a generator) of a mobile unit to be reset (e.g., automatically and without the need for human interaction). Thus, as will be appreciated by a person having ordinary skill in the art, various embodiments may save time and may reduce costs associated with the mobile unit. Further, various embodiments may increase uptime of a remote unit.

As will further be appreciated, various embodiments of the disclosure, as described more fully herein, provide a technical solution to one or more problems that arise from technology that could not reasonably be performed by a person, and various embodiments disclosed herein are rooted in computer technology in order to overcome the problems and/or challenges described below. Further, at least some embodiments disclosed herein may improve computer-related technology by allowing computer performance of a function not previously performable by a computer.

Embodiments of the disclosure will now be explained with reference to the accompanying drawings.

FIG. 1 illustrates a system 100, according to one or more embodiments of the disclosure. System 100, which may include a security and/or surveillance system, includes a unit 102, which may also be referred to herein as a "mobile unit," a "mobile security unit," a "mobile surveillance unit," a "physical unit," or some variation thereof. According to various embodiments, unit 102 may include one or more sensors (e.g., cameras, weather sensors, motion sensors, noise sensors, chemical sensors, without limitation) 104 and one or more output devices 106 (e.g., lights, speakers, electronic displays, without limitation). For example only, sensors 104 may include one or more cameras, such as thermal cameras, infrared cameras, optical cameras, PTZ cameras, bi-spectrum cameras, any other camera, or any combination thereof. Further, for example only, output devices 106 may include one or more lights (e.g., flood lights, strobe lights (e.g., LED strobe lights), and/or other lights), one or more speakers (e.g., two-way public address (PA) speaker systems), any other suitable output device (e.g., a digital display), or any combination thereof.

In some embodiments, unit 102 may also include one or more storage devices 108. Storage device 108, which may include any suitable storage device (e.g., a memory card, hard drive, a digital video recorder (DVR)/network video recorder (NVR), internal flash media, a network attached storage device, or any other suitable electronic storage device), may be configured for receiving and storing data (e.g., video, images, and/or i-frames) captured by sensors 104. In some embodiments, during operation of unit 102, storage device 108 may continuously record data (e.g., video, images, i-frames, and/or other data) captured by one or more sensors 104 (e.g., cameras, lidar, radar, environmental sensors, acoustic sensors, without limitation) of unit 102 (e.g., 24 hours a day, 7 days a week, or any other time scenario).

Unit 102 may further include a computer 110, which may include memory and/or any suitable processor, controller, logic, and/or other processor-based device known in the art. Moreover, although not shown in FIG. 1, unit 102 may include one or more additional devices including, but not limited to, one or more microphones, one or more solar panels, one or more power generators (e.g., fuel cell generators), or any combination thereof. Unit 102 may also include a communication device (e.g., a modem (e.g., a cellular modem, a satellite modem, a Wi-Fi modem, etc.) 112 that may comprise any suitable and known communication device, which may be coupled to sensors 104, output devices 106, storage device 108, and/or computer 110 via wired connections, wireless connections, or a combination thereof. In some embodiments, communication device 112 may include one or more radios and/or one or more antennas.

System 100 may further include one or more electronic devices 113, which may comprise, for example only, a mobile device (e.g., mobile phone, tablet, etc.), a desktop computer, or any other suitable electronic device including a display. Electronic device 113 may be accessible to one or more end-users. Additionally, system 100 may include a server 116 (e.g., a cloud server), which may be remote from unit 102. Communication device 112, electronic devices 113, and server 116 may be coupled to one another via the Internet 114.

According to various embodiments of the disclosure, unit 102 may be within a first location (a "camera location" or a "unit location"), and server 116 may be within a second location, remote from the first location. In addition, each electronic device 113 may or may not be remote from unit 102 and/or server 116. As will be appreciated by a person having ordinary skill in the art, system 100 may be modular, expandable, and/or scalable.

As noted above, in some embodiments, unit 102 may include a mobile unit (e.g., a mobile security/surveillance unit). In these and other embodiments, unit 102 may include a portable trailer (not shown in FIG. 1), a storage box (e.g., including one or more batteries) (not shown in FIG. 1), and a mast (not shown in FIG. 1) coupled to a head unit (e.g., including, for example, one or more cameras, one or more lights, one or more speakers, and/or one or more microphones) (not shown in FIG. 1). According to various examples, in addition to sensors and output devices, a head unit of unit 102 may include and/or be coupled to storage device 108, computer 110, and/or communication device 112.

Figure 2A:
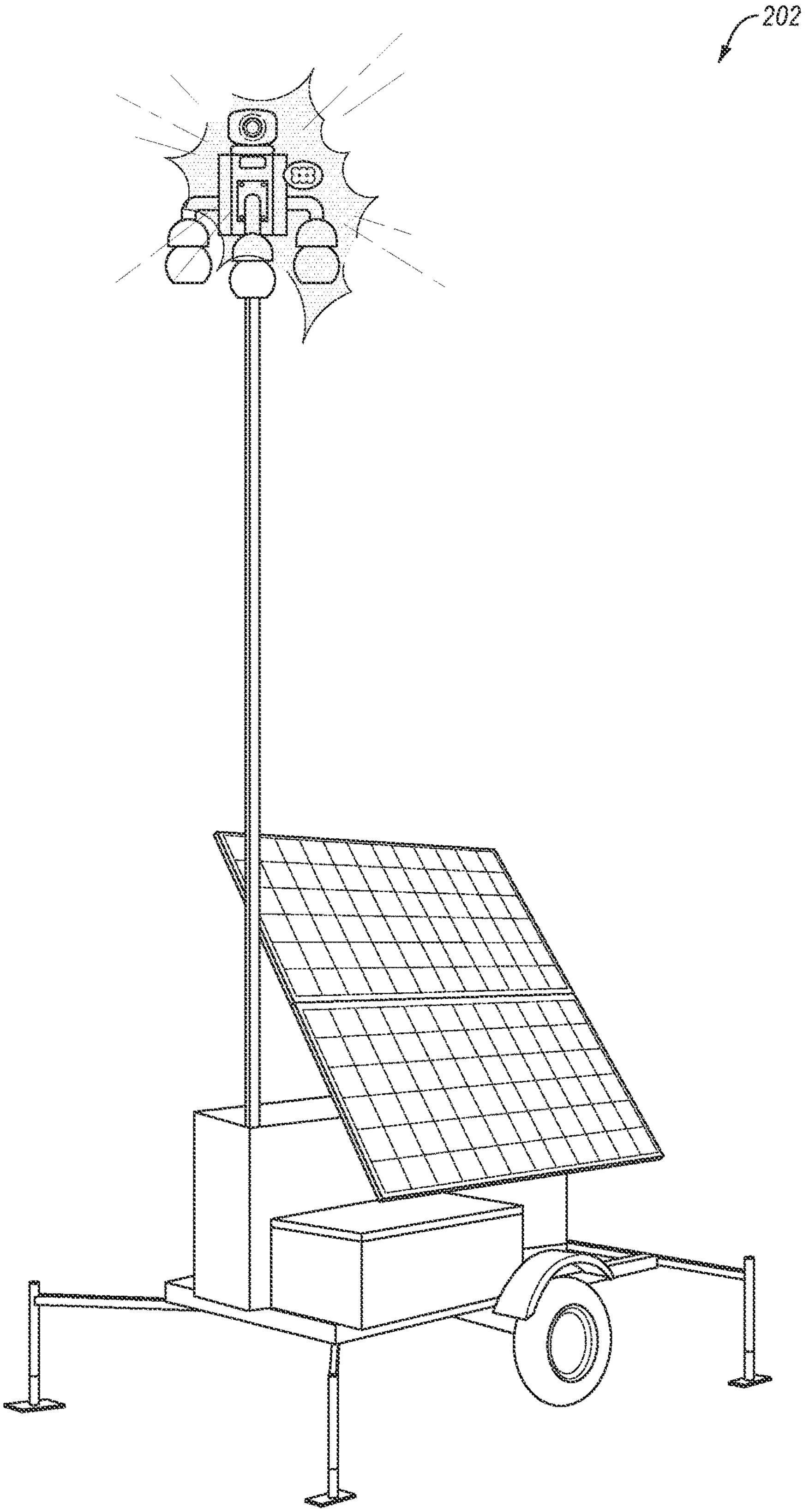
FIGS. 2A-2C illustrate examples of a mobile unit, in accordance with various embodiments of the disclosure.
Figure 2B:
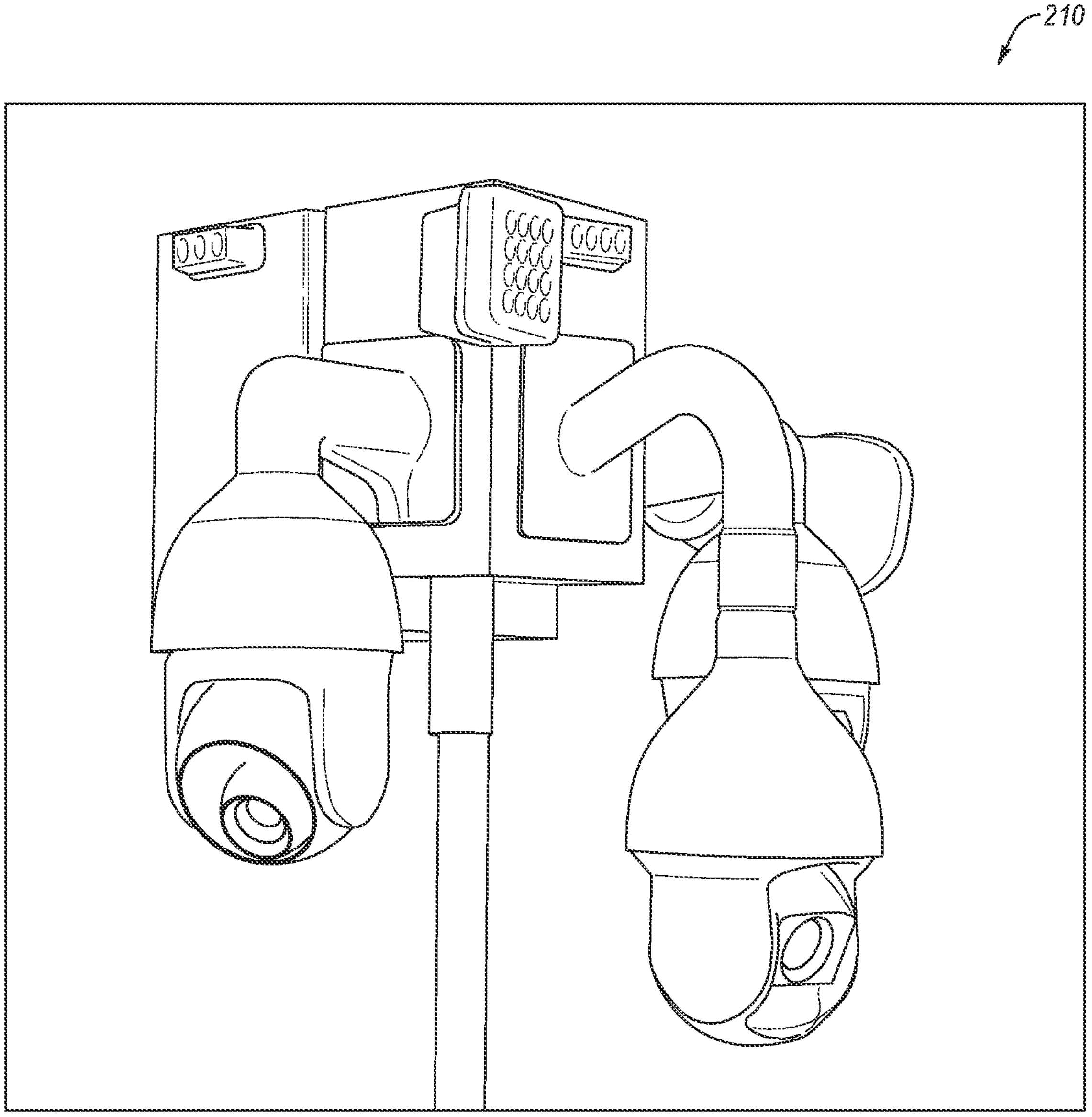
Figure 2C:
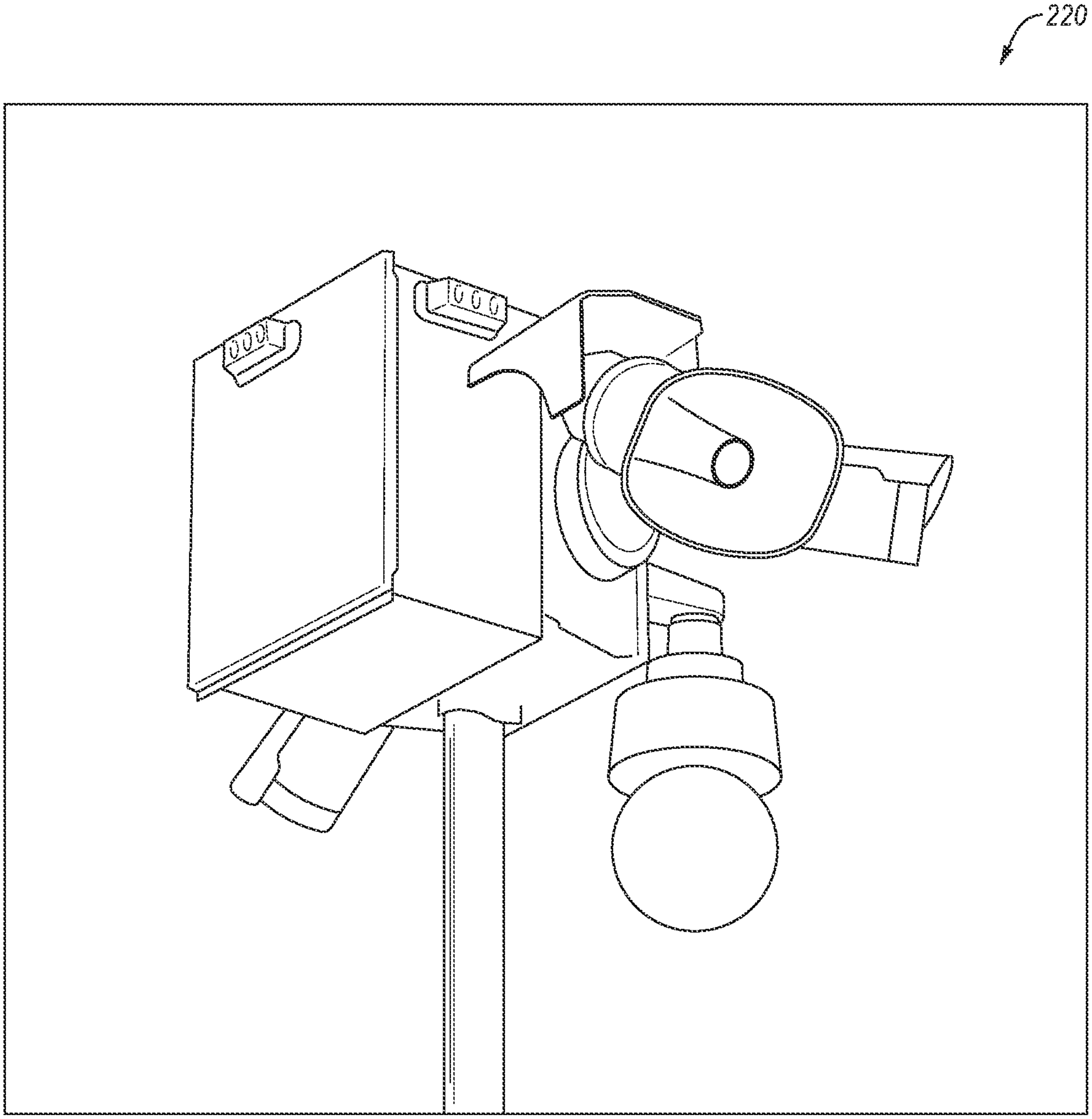

Non-limiting examples of unit 102 are shown in FIGS. 2A-2C. More specifically, FIG. 2A illustrates a mobile unit 202 including a trailer, a storage box, a mast, and a head unit; FIG. 2B illustrates a head unit 210 (i.e., of a mobile unit) including a number of lights, a number of cameras, and a speaker; and FIG. 2C is another depiction of a head unit 220 (i.e., of a mobile unit) including a number of lights, a number of cameras, and a speaker. As an example, a mobile unit may be configured to be positioned in an environment (e.g., a parking lot, a roadside location, a construction zone, a concert venue, a sporting venue, a school campus, without limitation).

Figure 3:
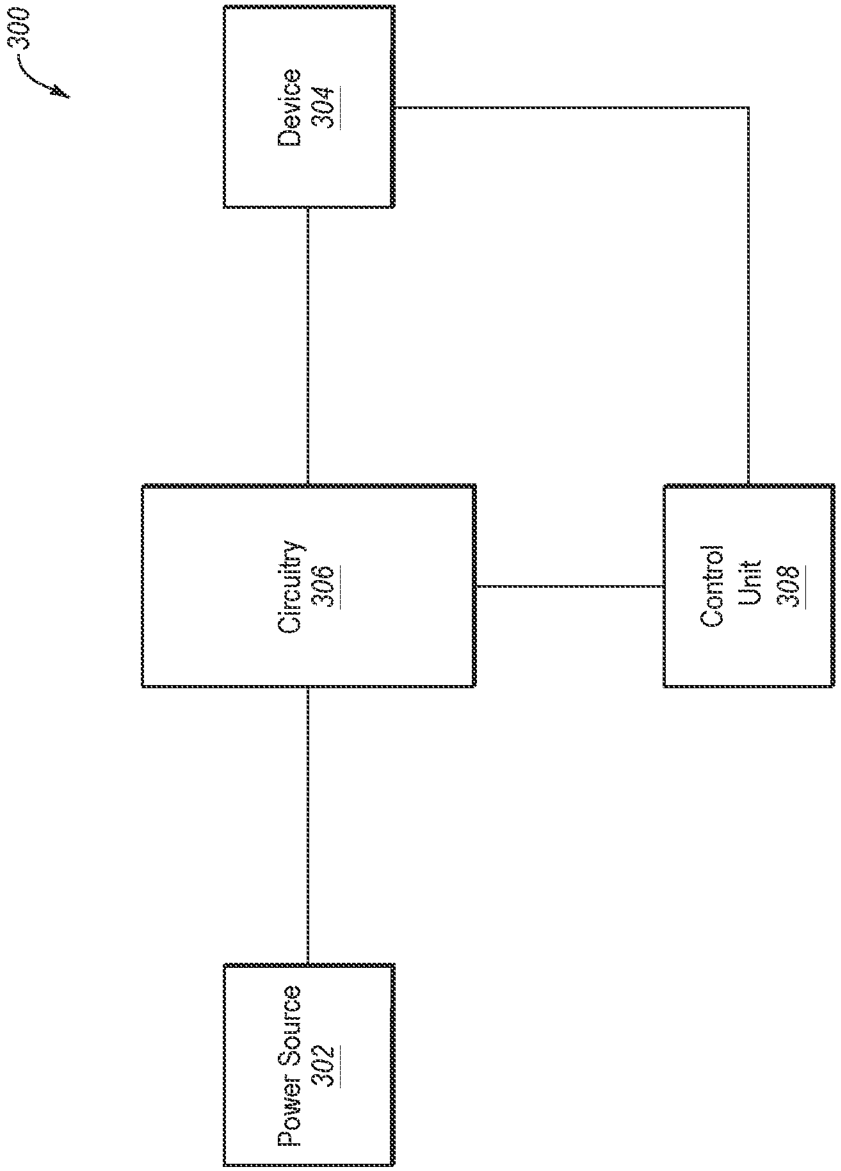
FIG. 3 depicts an example system including a network device, according to various embodiments of the disclosure.

FIG. 3 depicts an example system 300, according to various embodiments of the disclosure. System 300, which may include and/or may be part of a network, includes a power source 302 coupled to a device 304 via circuitry 306. For example, device 304, which may be part of a network (e.g., of a number of devices), may include one or more communication devices, a power generator (e.g., a fuel cell generator), or any other suitable device. System 300 may further include a control device (also referred to herein as a "control unit") 308, which may include a controller, a CPU, a computer (e.g., at least a portion of computer 110 of FIG. 1), or any other suitable control device.

For example, circuitry 306 may include any suitable switch, such as a relay including a coil, a switch, and an input. More specifically, for example, circuitry 306 may include a normally closed relay including a coil and a switch. As will be appreciated, a switch of a normally closed relay is in a closed position by default and is opened in response to a signal applied to an input. Thus, in this example, in a default configuration, power source 302 may be coupled to device 304. For example, power source 302 may include any suitable power source, such as an energy storage device, a battery, or any other power source. In some embodiments, system 300 may also include a power over ethernet (POE) device (e.g., a POE switch) (not shown in FIG. 3) coupled between power source 302 and circuitry 306.

During a contemplated operation of system 300, a signal may be conveyed (e.g., from control unit 308) to device 304, and if a returned signal (i.e., from device 304) is received (e.g., at control unit 308) it may be determined that device is in an operative state (i.e., device 304 is functioning properly). In response to a lack of a return signal (i.e., from device 304) (e.g., received at control unit 308), it may be determined that device 304 is malfunctioning and is in a non-operative state (e.g., device 304 has hung, froze, crashed, is unreachable, fails to respond, etc.). Further, in response to determining that device 304 is in a non-operative state, a signal may be sent to circuitry 306 to disconnect power source 302 from device 304. For example, circuitry 306 may be configured to disconnect power source 302 from device 304 for a predetermined time period, and upon expiration of the predetermined time period, power source 302 may be recoupled to device 304 via circuitry 306.

Figure 4:
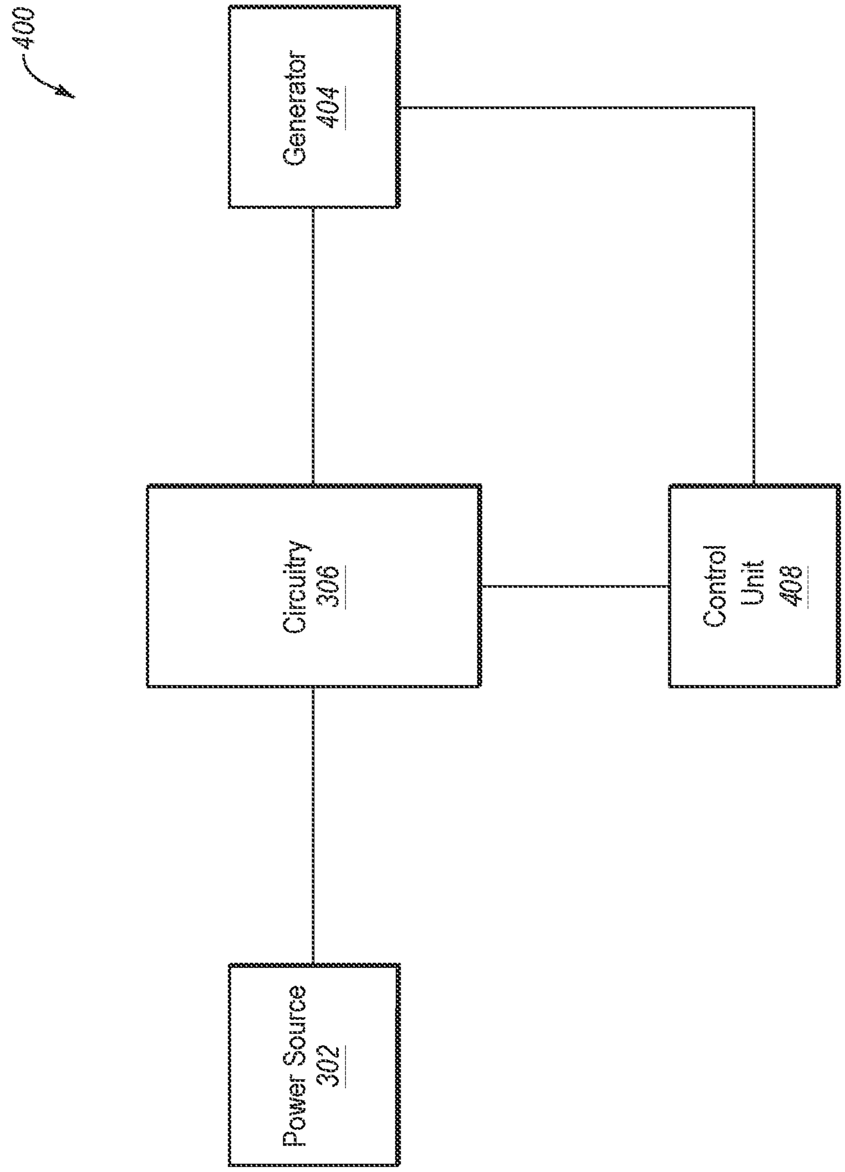
FIG. 4 illustrates another example system including a network device, according to various embodiments of the disclosure.

FIG. 4 depicts an example system 400, according to various embodiments, wherein device 304 (i.e., of FIG. 3) includes a power generator, such as, for example only, a fuel cell generator 404. As a non-limiting example, fuel cell generator 404 may include an EFOY® fuel cell made by SFC Energy AG of Brunnthal, Germany.

Figure 5A:
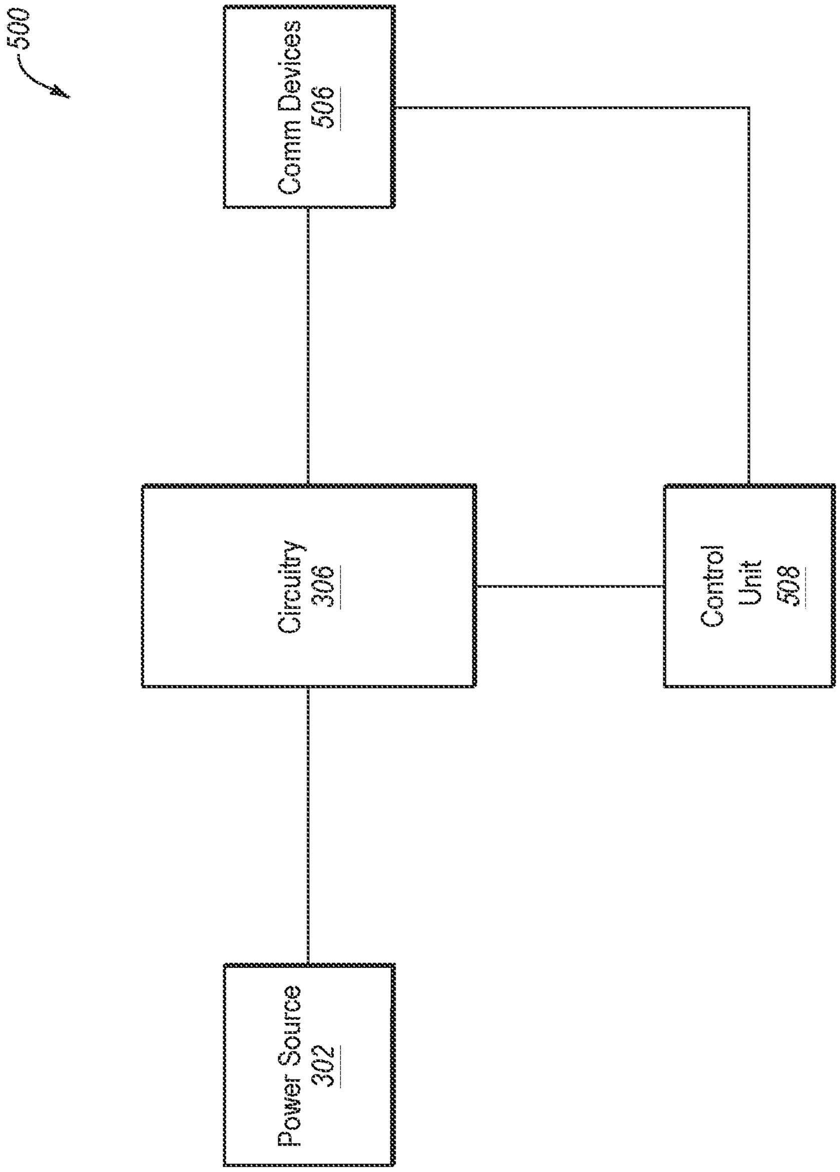
FIG. 5A illustrates yet another example system including a network device, in accordance with various embodiments of the disclosure.
Figure 5B:
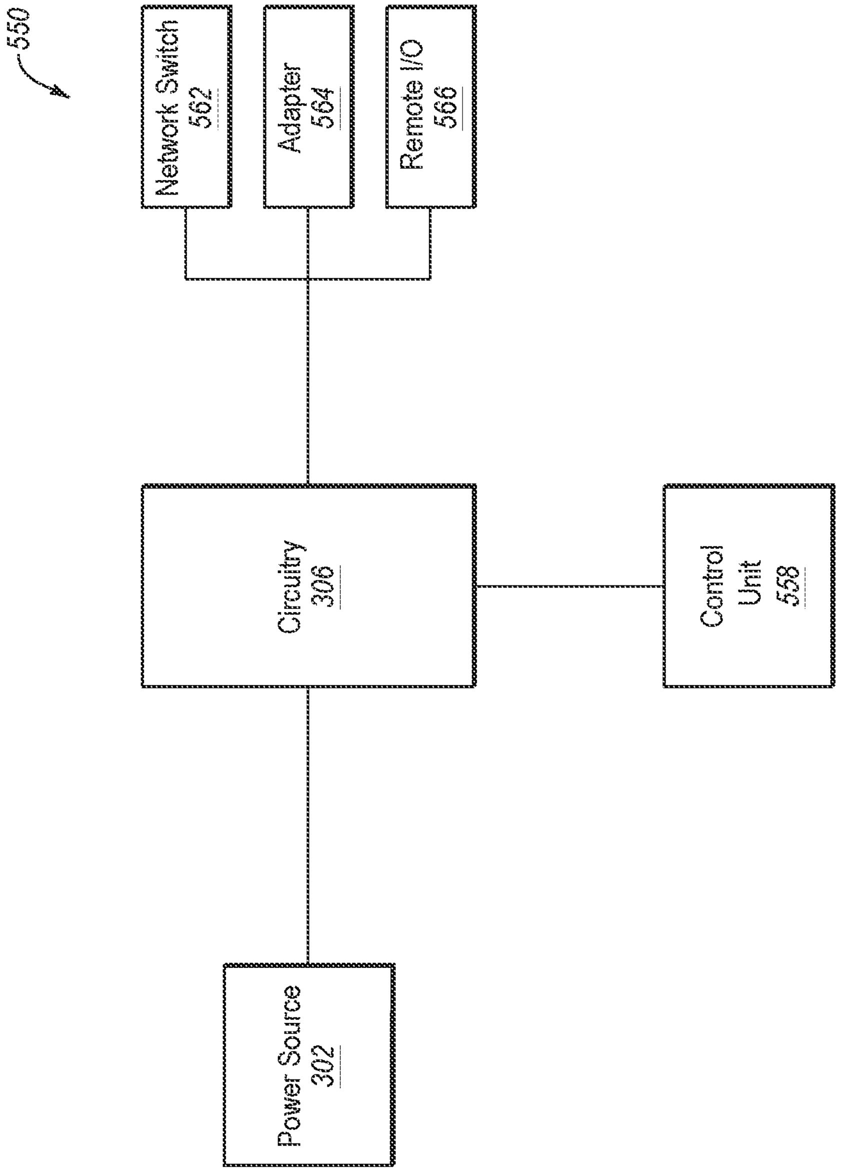
FIG. 5B is a more detailed illustration of an example system including a network device, according to various embodiments of the disclosure.

FIG. 5A depicts an example system 500, according to various embodiments, wherein device 304 (i.e., of FIG. 3) includes a number of communication devices 506. Further, FIG. 5B depicts a more specific example system 550 wherein device 304 (i.e., of FIG. 3) includes a number of communication devices, such as a network switch 562 (e.g., an Ethernet switch), an Ethernet to serial converter 564 (also referred to as a converter, an Ethernet to serial adapter, or an adapter), and an I/O device 566 (e.g., a remote I/O device).

Figure 6:
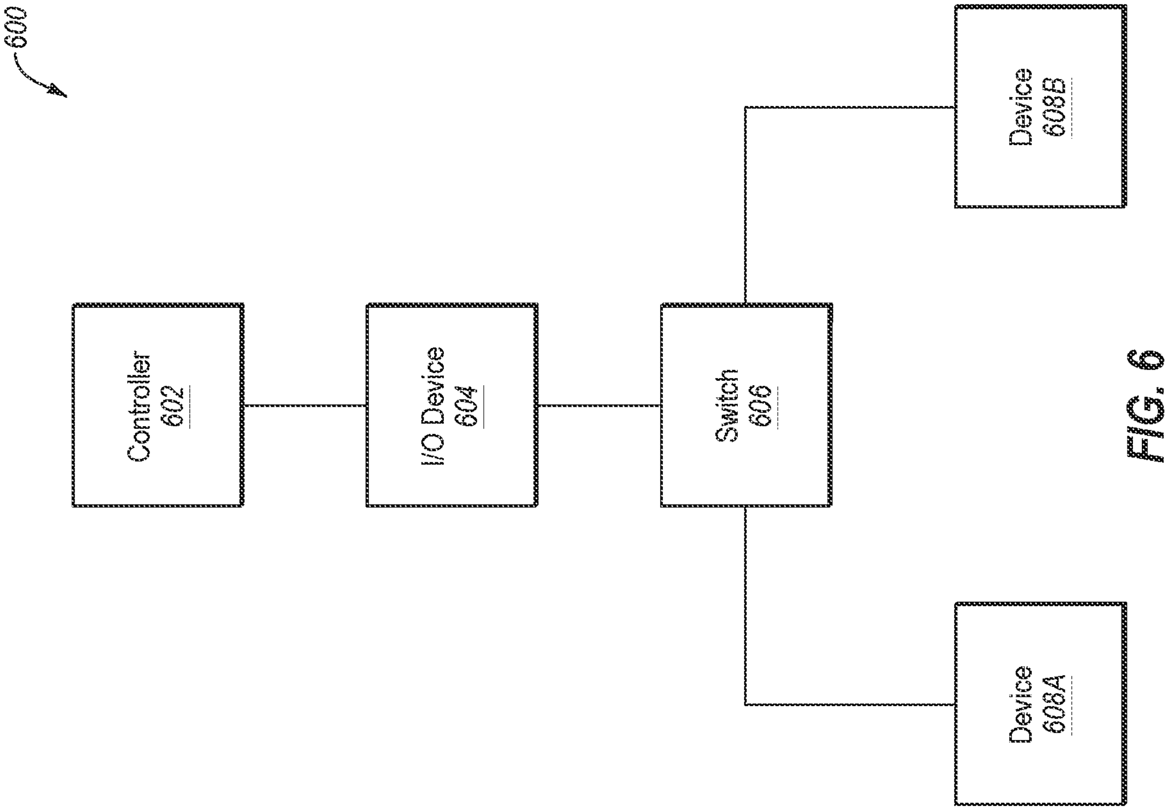
FIG. 6 depicts a network diagram of an example system, in accordance with various embodiments of the disclosure.

FIG. 6 is a network diagram of a system 600, according to various embodiments of the disclosure. System 600 includes a controller 602, an I/O device 604, a switch 606 (e.g., a network switch, such as an Ethernet switch), and a number of devices 608 (e.g., power generator, one or more communication devices, or any other suitable device). It is noted that I/O device 604 may include a two-port (e.g., built-in two-port) switch that allows I/O device 604 to be coupled to (from a network perspective) before switch 606, which may include, for example only, a 5 port ethernet switch.

Figure 10:
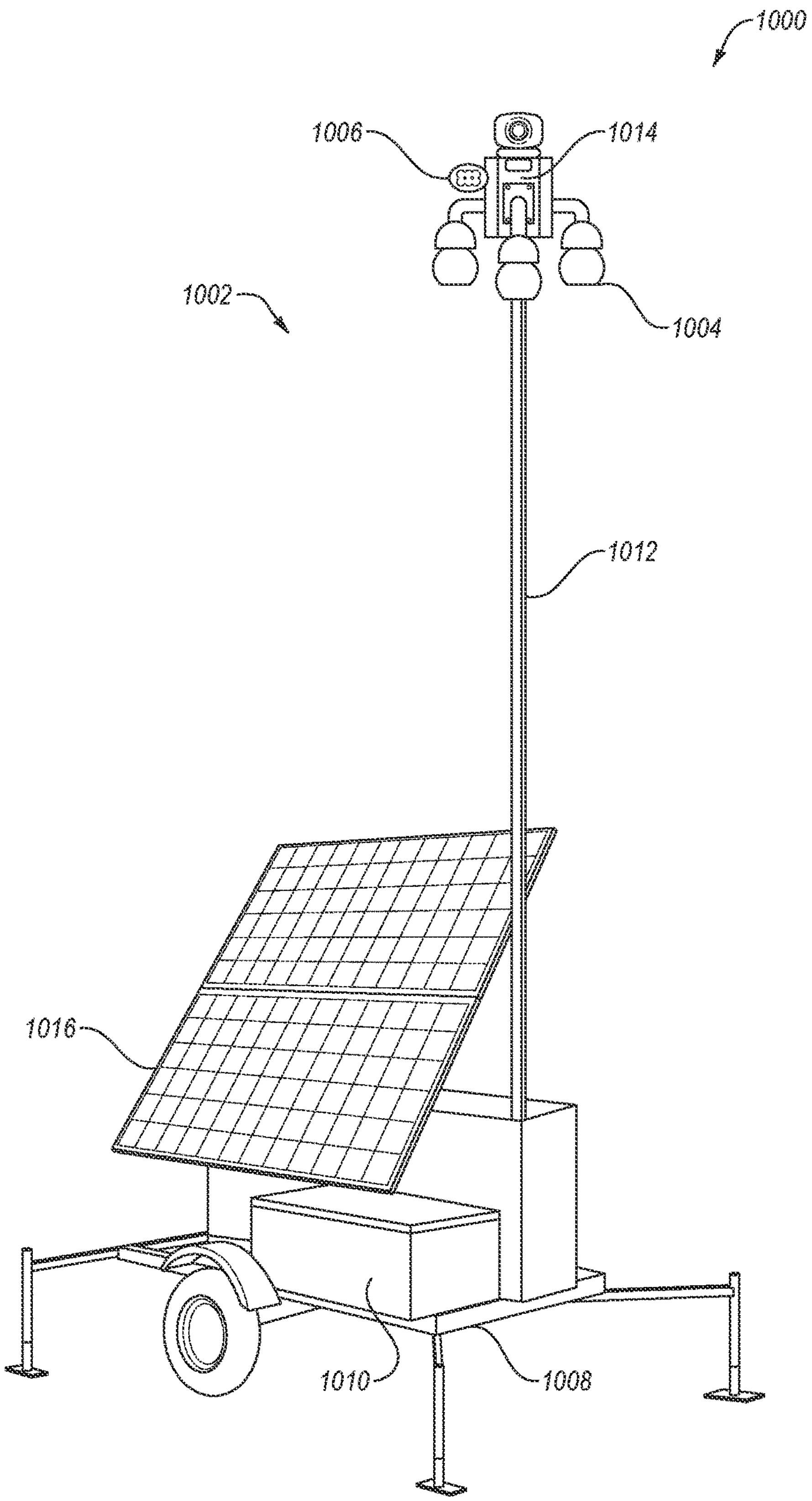
FIG. 10 depicts an example system including a mobile unit, in accordance with various embodiments of the disclosure.

For example, system 600 may be part of a mobile unit (e.g., unit 102 of FIG. 1 and/or unit 1002 of FIG. 10). As a more specific example, one or more of I/O device 604, switch 606, and possibly at least one device 608A, 608B may be positioned in a storage box (e.g., a storage box 1010 of FIG. 10) of a mobile unit and controller 602 may be positioned in a head unit (e.g., a head unit 1014 of FIG. 10) of the mobile unit. As an even more specific example, one or more of I/O device 604, switch 606, and possibly at least one device 608A, 608B may be positioned within a swappable unit, as described more fully below, wherein the swappable unit may be positioned within the storage box of the mobile unit.

As noted above, in various embodiments, a signal may be conveyed (e.g., from controller 602) to a specific device (e.g., device 608A or 608B) within system 600, and if a returned signal (i.e., from the specific device) is received (e.g., at controller 602) it may be determined that specific device is in an operative state (i.e., the specific device is functioning properly). In response to a lack of a return signal (i.e., from the specific device) (e.g., received at controller 602), it may be determined that the specific device is in a non-operative state (e.g., the specific device has hung, froze, crashed, is non-responsive, etc.). As noted herein, in response to determining that a device is in a non-operative state, the device may be temporarily disconnected (e.g., via a relay) from a power source to reset the device.

Figure 7:
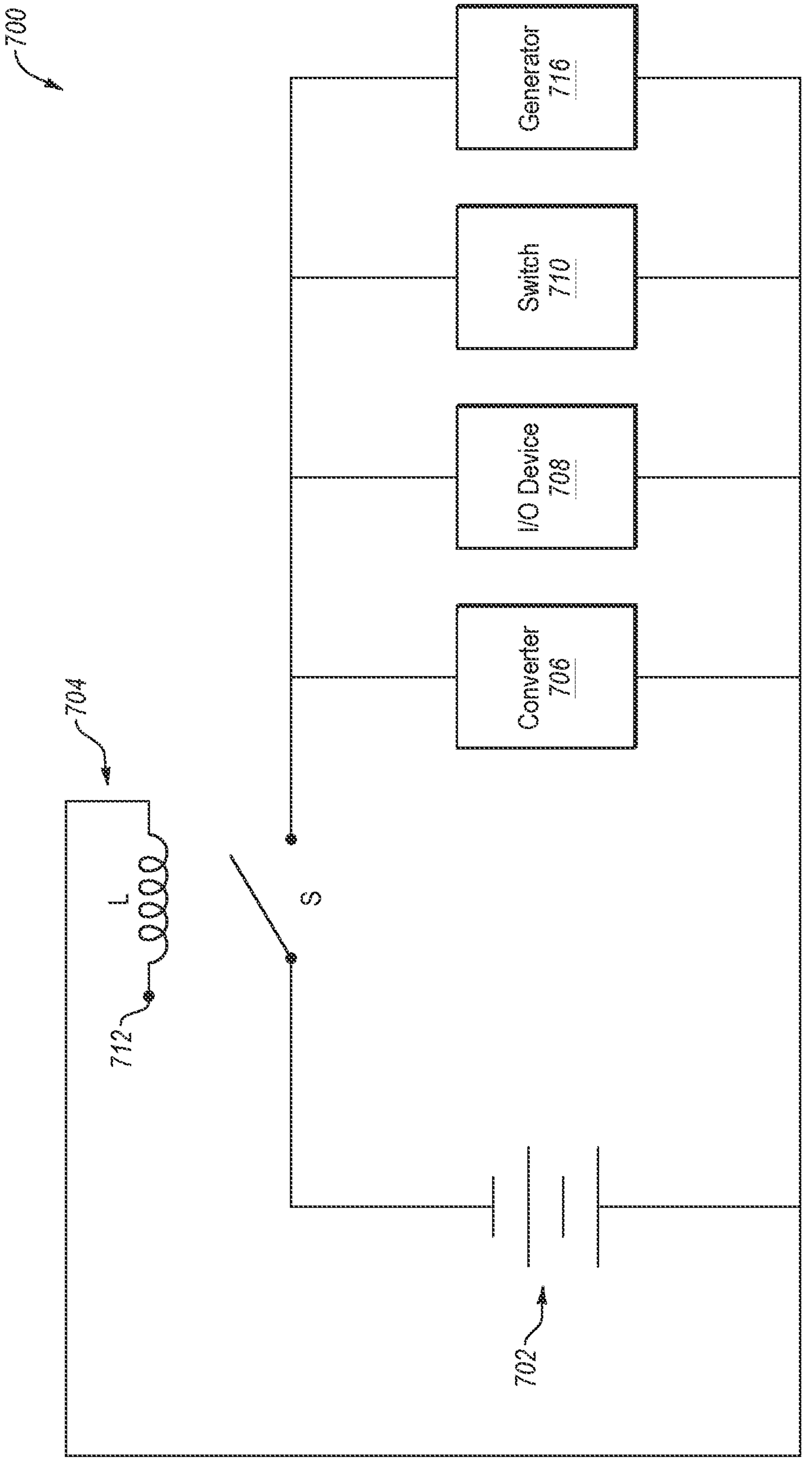
FIG. 7 illustrates another example system, according to various embodiments of the disclosure.

FIG. 7 illustrates an example system 700, according to various embodiments of the disclosure. System 700 includes a battery 702, a relay 704 (i.e., including a switch S, a coil L, and an input 712), a converter 706, an I/O device 708, and a switch 710. A relay input 712 is configured to receive a signal (e.g., from a controller, I/O device 708, or another device) to energize coil L and trigger switch S. As will be appreciated, in an embodiment wherein relay 704 is a normally closed relay, switch S may be closed by default, and upon a voltage being applied to coil L (i.e., via input 712), switch S may open, thus disconnecting battery 702 from each of converter 706, I/O device 708, and switch 710. It is noted that in at least this embodiment, I/O device 708, which may send a signal to input 712, is reset responsive to receipt of the signal at input 712 and the resulting toggling of power to I/O device 708.

In some examples wherein I/O device 708 is malfunctioning, as long as I/O device 708 is reachable (e.g., a control can still communicate with I/O device 708), I/O device 708 may be able to reset itself (i.e., via sending a signal to input 712). In other examples wherein I/O device 708 is malfunctioning and is unreachable, it may be necessary to reset I/O device 708 via another process (e.g., via manual reset).

In some embodiments, system 700 may include a generator 716, which may include, for example only, a fuel cell generator. In other embodiments, a device (e.g., a mobile unit) may include one system (e.g., system 700) without generator 716 (e.g., the system includes converter 706, I/O device 708, and/or switch 710) and another system including generator 716 (e.g., generator 716 may be coupled to a relay that may or may not be coupled to other network devices). More specifically, in one example, generator 716 may be coupled to a dedicated relay.

As will be appreciated by a person having ordinary skill, circuitry, such as relay 704 or other associated circuitry may be selected and/or configured such that switch S remains open for a desired time duration, which may be of sufficient duration (e.g., 2 seconds, 3, seconds, 4 seconds, 10 seconds, without limitation) to ensure that the devices (e.g., converter 706, I/O device 708, and switch 710) are reset after expiration of the time duration and switch S is closed.

According to various embodiments, a relay (e.g., relay 704) may have a programmable time duration. More specifically, for example, a relay may include (or may be coupled to) a dial (or another component) that may be used to set a desired time duration for the relay. In other embodiments, a relay (e.g., a relay coupled to a power generator) may be set via, for example, software.

For example, system 700 may be part of a mobile unit (e.g., unit 102 of FIG. 1 and/or unit 1002 of FIG. 10). As a more specific example, one or more of battery 702, relay 704, converter 706, I/O device 708, and switch 710 may be positioned in a storage box (storage box 1010 of FIG. 10) of a mobile unit. As an even more specific example, one or more of relay 704, converter 706, I/O device 708, and switch 710 may be positioned with a swappable unit, as described more fully below.

As noted above, in at least some embodiments, relay 704 may include a normally closed relay, and thus it will be understood by a person having ordinary skill in the art, that relay 704 is depicted in FIG. 7 as being in an open state (i.e., in response to being energized).

During a contemplated operation of system 700, after determining that at least one device (e.g., converter 706, I/O device 708, and/or switch 710) is in a non-operative state (e.g., due to a lack of response from the at least one device), a signal may be sent to input 712 to excite coil L and open switch S, and, as a result, each of converter 706, I/O device 708, and switch 710 may be decoupled from battery 702. More specifically, in some embodiments, I/O device 708 may send a signal to input 712 to open switch S. As a more specific example, in response to a controller (e.g., control unit 308, control unit 408, control unit 508, control unit 558, and/or controller 602) determining that the at least one device is in a non-operative state, the controller may send a signal to I/O device 708, which may send a signal to input 712 to cause switch S to open (i.e., momentarily).

It is noted that relay 704 may include time delay off relay. Thus, in this embodiment, once relay 704 receives a signal (via input 712), relay 704 stays on for a set amount of time (e.g., adjusted via a dial on relay) and then turns off. This may ensure that relay 704 stays on (i.e., for a sufficient time to reset one or more devices) even after a device controlling relay 704 has lost power due to the resetting state.

It is noted that relay 704 is provided as example circuitry for decoupling and coupling components, however the disclosure is not so limited and any suitable circuitry for decoupling and coupling components may be within the scope of the disclosure. More specifically, for example, circuitry 306 (see FIG. 3) may include any suitable circuitry for decoupling and coupling one or more devices from one or more power sources.

It will be appreciated that one or more devices (e.g., of a mobile unit) may be tested automatically and/or periodically. More specifically, for example, a controller (e.g., computer 110 of FIG. 1, control unit 308 of FIG. 3, control unit 408 of FIG. 4, control unit 508 of FIG. 5A, control unit 558 of FIG. 5B, and/or controller 602 of FIG. 6) or another device may be configured to periodically (e.g., every 10 seconds, every 30 seconds, every minute, every 2 minutes, every 5 minutes, once an hour, or any other suitable time duration) ping (i.e., send a signal) each of the one or more devices to determine an operating state (i.e., operative or non-operative) of each of the one or more devices (i.e., based on whether or not a return signal is received).

Figure 8:
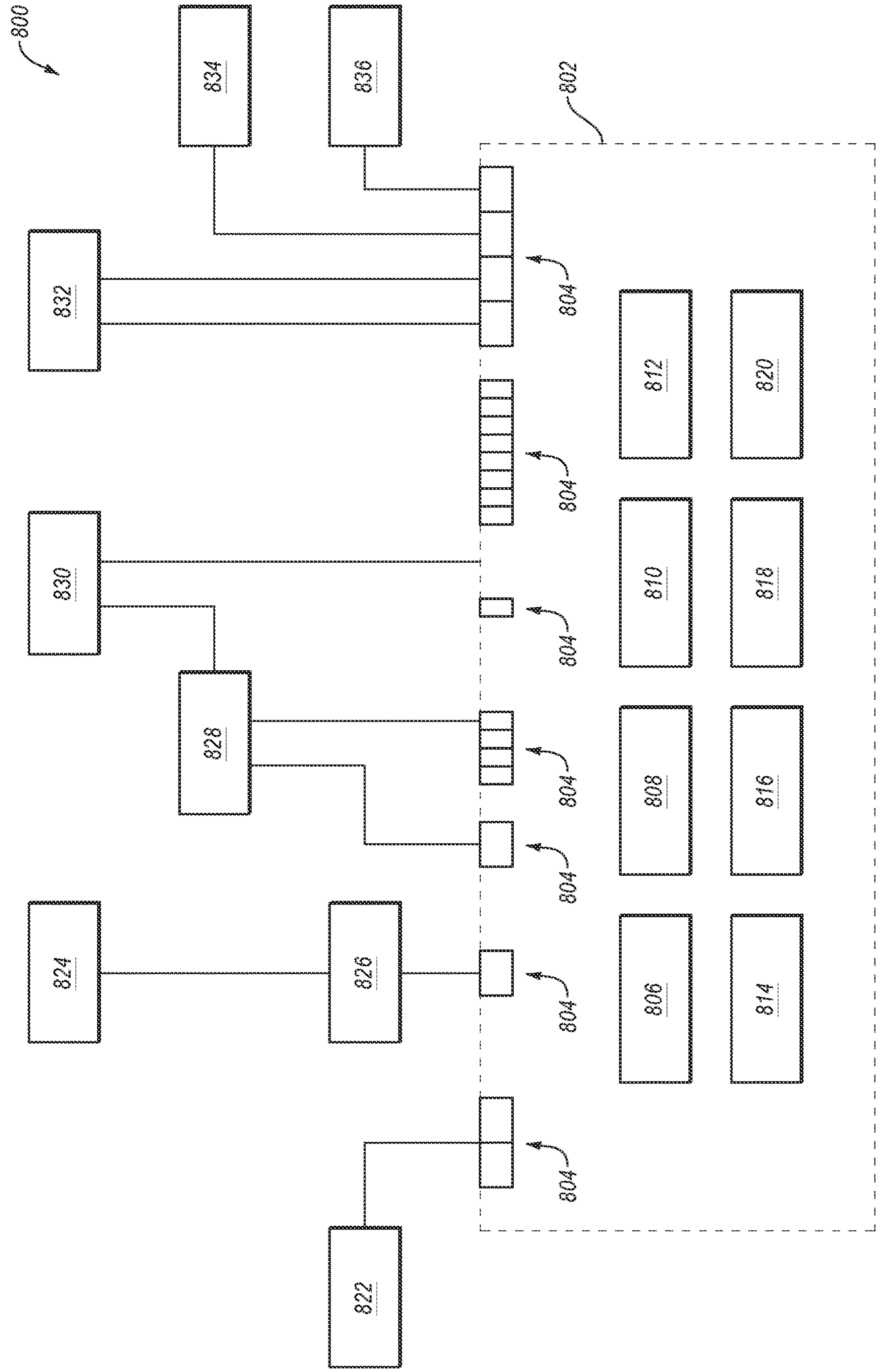
FIG. 8 is a block diagram illustrating a system including a swappable unit, according to various embodiments of the disclosure.

According to other embodiments of the disclosure, a device (e.g., a mobile surveillance unit) may include a swappable unit. For example, FIG. 8 illustrates another example system 800 including a swappable unit 802 (also referred to herein as a "swappable enclosure" or a "swappable controls enclosure"), in accordance with various embodiments of the disclosure. According to various embodiments, swappable unit 802, which may be configured to house a number of components for a mobile surveillance unit, may include quick connects for simplified and efficient installation, diagnostics, and/or repair.

For example, swappable unit 802 may include a number of interface ports 804 for coupling to external components. Further, swappable unit 802 may include various internal components, such as, for example, an Ethernet switch 806, an I/O device 808, an I/O module 810, an operating panel 812, a converter (e.g., TCP to RTU converter) 814, a charge controller 816, a current-sensing module 818, a power generator interface 820, and/or other components associated with, for example only, network distribution, power management, and/or circuit protection. For example only, the external components may include one or more output devices 822 (e.g., lights, speakers, electronic display, etc.), a head unit 824 (e.g., including a controller and/or electronic storage), a reel 826 (e.g., Ethernet and/or power reel), a power generator (e.g., a fuel cell) 828, a power generator manager 830, one or more solar panels 832, a charger 834 (e.g., AC charger), one or more battery banks 836, and/or other suitable devices.

Figure 9:
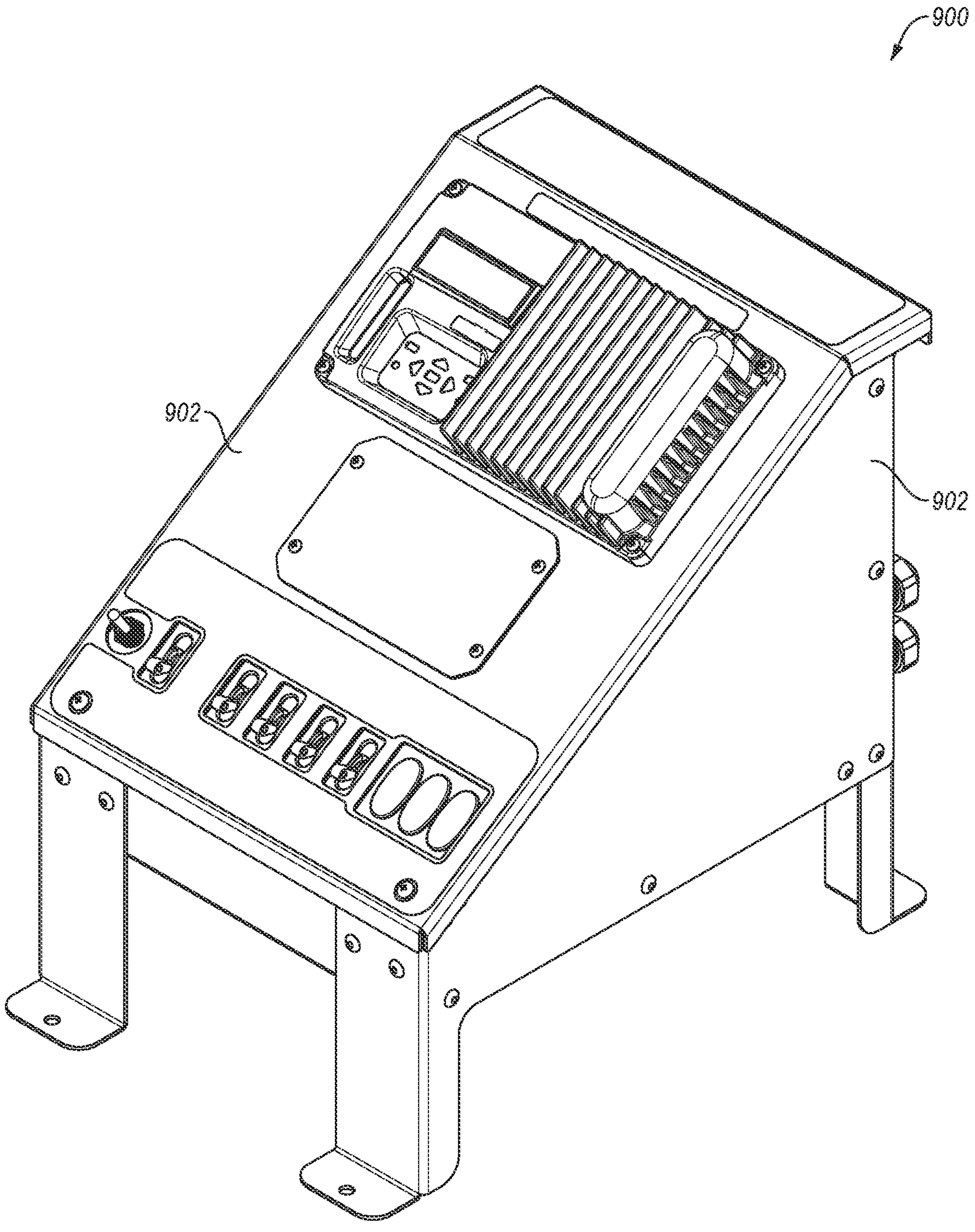
FIG. 9 depicts an example swappable unit, in accordance with various embodiments of the disclosure.

FIG. 9 in another illustration of a swappable unit 900 (e.g., swappable unit 802 of FIG. 8) including a housing (e.g., an enclosure) 902, in accordance with various embodiments of the disclosure. As shown in FIG. 9, swappable unit 900 may further include an interface including a number of controls (e.g., buttons and/or switches), ports, and/or possibly a display (e.g., electronic display). As will be appreciated, swappable unit 900 may be easily installed (e.g., on a mobile unit), removed (e.g., from a mobile unit), and/or replaced (i.e., with another swappable unit). In other words, swappable unit 900 may simplify the installation, removal, diagnosis, and repair processes, thus increasing efficiency and reducing errors (e.g., during diagnosis, repair, and installation). Swappable unit 900 may reduce, or prevent, technician revisits and confusing diagnostics. As an example, instead of repairing at a remote site (e.g., where an associated mobile unit is positioned), a technician may quickly remove swappable unit 900 so that swappable unit 900 may be transported to a location more suitable for diagnostic and/or repair. Yet more specifically, for example, wiring within swappable unit 900 may be relatively complex and thus enabling a technician to easily disconnect a few (e.g., relatively simple) connections and transport swappable unit 900 to a location of more skilled personnel and/or more ideal working conditions may be advantageous in diagnostic and/or repair of swappable unit 900 (i.e., compared to a technician (e.g., who may or may not have the expertise of another) navigating the complex wiring of swappable unit 900 at the remote location of an associated mobile surveillance unit). For example, swappable unit 900 may be removed from a mobile unit and transported to a facility, which may include a custom testing device to aid in testing and/or diagnosis of swappable unit 900.

With reference to FIGS. 8 and 9, an example scenario including installation and repair of swappable unit 900 and/or components thereof will now be described. In this example, personnel (e.g., a manufacturer) may build out swappable unit 900 (e.g., in a control room (e.g., at a manufacturing facility)). For example, building out swappable unit 900 may include installing and configuring one or more internal components, such as, for example, Ethernet switch 806, I/O device 808, I/O module 810, operating panel 812, converter 814, a charge controller 816, a current-sensing module 818, a power generator interface 820, and/or other components associated with, for example, network distribution, power management, and/or circuit protection. As will be appreciated, at least some of the internal components may be operably coupled to, for example, another internal component and/or one or more interface ports 804.

Further, swappable unit 900 may be installed on a mobile unit (e.g., within a storage box (e.g., storage box 1010 of FIG. 10)) via connecting one or more external components (output devices 822 (e.g., lights), head unit 824, reel 826, power generator 828, power generator manager 830, one or more solar panels 832, charger (e.g., AC charger) 834, and/or one or more battery banks 836) to one or more interface ports 804. In one example, swappable unit 900 may be installed at the manufacturing facility. In another example, swappable unit 900 may be easily installed (e.g., via simple coupling of external components to interface ports 804) at a remote location (e.g., by a field technician) (i.e., after transporting the associated mobile unit and the swappable unit).

Continuing with this example, subsequently, responsive to determining that swappable unit 900 is malfunctioning, swappable unit 900 may be easily removed from the associated mobile unit such that diagnosis may be simplified. Further, if necessary, swappable unit 900 may be removed and replaced with another properly functioning swappable unit. Further, after removal, swappable unit 900 may be transported to another location (e.g., back to the manufacturing facility) for simplified diagnostic, repair, or replacement of one or more internal components of swappable unit 900.

FIG. 10 depicts another example system 1000 including a unit 1002, in accordance with various embodiments of the disclosure. Unit 1002, which may also be referred to herein as a "mobile unit," a "mobile security unit," a "live unit," or a "physical unit," may be configured to be positioned in an environment (e.g., a parking lot, a roadside location, a construction zone, a concert venue, a sporting venue, a school campus, without limitation). In some embodiments, unit 1002 may include one or more sensors (e.g., cameras, weather sensors, motion sensors, noise sensors, without limitation) 1004 and one or more output devices 1006 (e.g., lights, speakers, electronic displays, without limitation). Unit 1002 may also include at least one storage device (e.g., internal flash media, a network attached storage device, or any other suitable electronic storage device), which may be configured for receiving and storing data (e.g., video, images, audio, without limitation) captured by one or more sensors of unit 1002. According to some embodiments, unit 1002 may be part of at least a portion of system 100 of FIG. 1, system 300 of FIG. 3, system 400 of FIG. 4, system 500 of FIG. 5A, system 550 of FIG. 5B, system 600 of FIG. 6, system 700 of FIG. 7, and/or system 800 of FIG. 8.

In some embodiments, unit 1002 may include a mobile security unit. In these and other embodiments, unit 1002 may include a portable trailer 1008, a storage box 1010, and a mast 1012 coupled to a head unit 1014 which may include for example, one or more batteries, one or more cameras, one or more lights, one or more speakers, and/or one or more microphones. According to some embodiments, a first end of mast 1012 may be proximate storage box 1010 and a second, opposite end of mast 1012 may be proximate, and possibly adjacent, head unit 1014. More specifically, in some embodiments, head unit 1014 may be coupled to mast 1012 an end opposite an end of mast 1012 proximate storage box 1010.

According to various embodiments, a swappable unit (e.g., swappable unit 802 of FIG. 8) may be positioned within storage box 1010 and coupled to various external components via one or more interface connections (e.g., interface ports 804 of FIG. 8).

In some examples, unit 1002 may include one or more primary batteries (e.g., within storage box 1010) and one or more secondary batteries (e.g., within head unit 1014). In these embodiments, a primary battery positioned in storage box 1010 may be coupled to a load and/or a secondary battery positioned within head unit 1014 via, for example, a cord reel (e.g., configured for Ethernet and/or power).

In some embodiments, unit 1002 may also include one or more solar panels 1016, which may provide power to one or more batteries of unit 1002. More specifically, according to some embodiments, one or more solar panels 1016 may provide power to a primary battery within storage box 1010. Although not illustrated in FIG. 10, unit 1002 may also include one or more additional power sources, such as one or more generators (e.g., fuel cell generators), which may or may not be positioned within storage box 1010.

Figure 11:
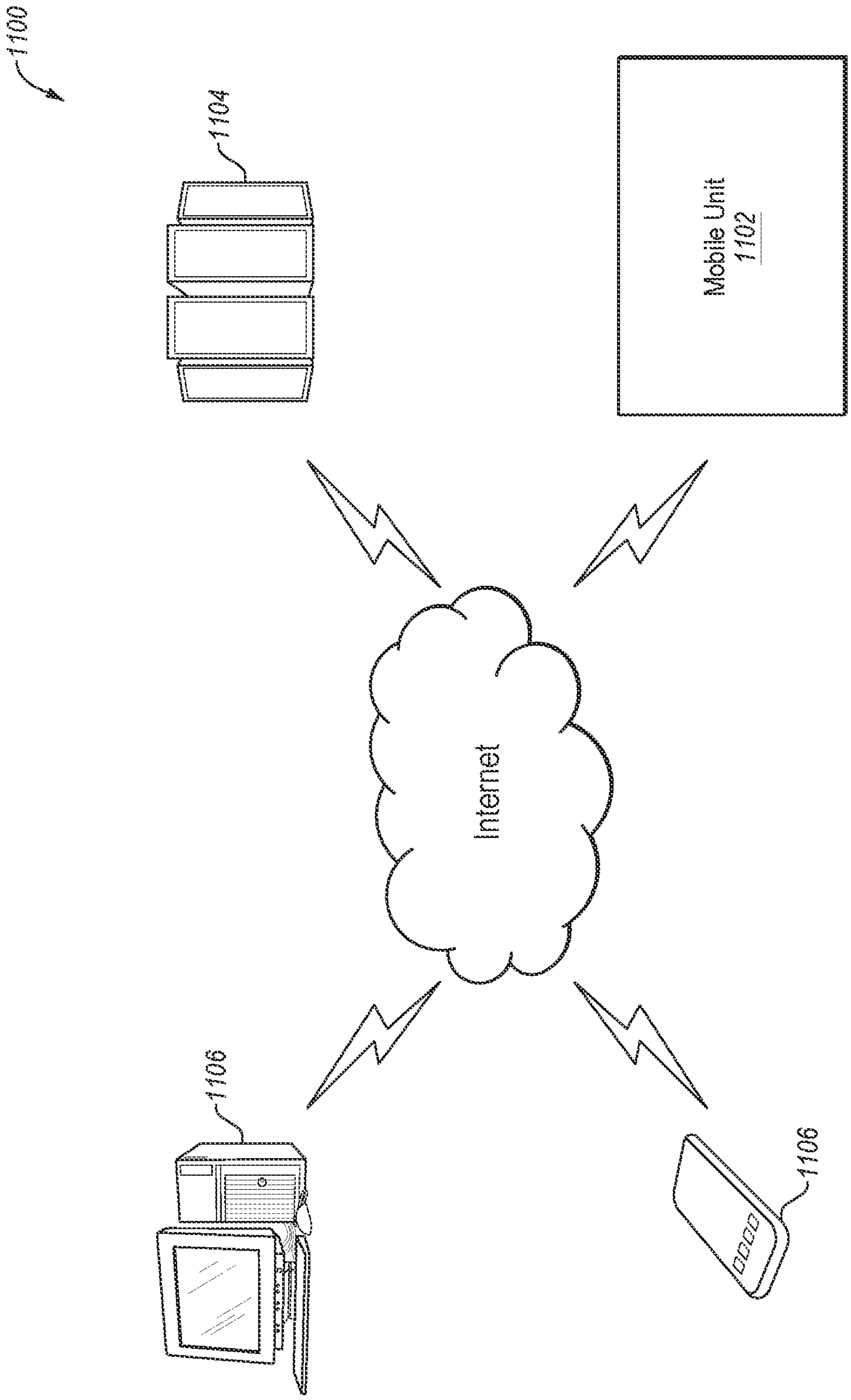
FIG. 11 depicts an example system including a mobile unit, a server, and one or more devices, in accordance with various embodiments of the disclosure.

FIG. 11 depicts a system 1100, in accordance with various embodiments of the disclosure. System 1100 includes a mobile unit 1102, a server 1104, and one or more devices 1106. In one non-limiting example, mobile unit 1102 includes mobile unit 1002 (see FIG. 10), server 1104 may include a cloud server or any other server, and device(s) 1106 may include an electronic device, such as a user device (e.g., mobile phone, tablet, etc.), a desktop computer, or any other suitable electronic device (e.g., including a display). According to various embodiments, each of server 1104 and device(s) 1106 may be remote from mobile unit 1102.

According to various embodiments of the present disclosure, mobile unit 1102, which includes a modem (e.g., communication device 112, 113, 506), may be within a first location (a "camera location" or a "remote location"), and server 1104 may be within a second location, remote from the camera location. In addition, in at least some examples, electronic device 1106 may be remote from the camera location and/or server 1104. As will be appreciated by a person having ordinary skill in the art, system 1100 is modular, expandable, and scalable.

Figure 12:
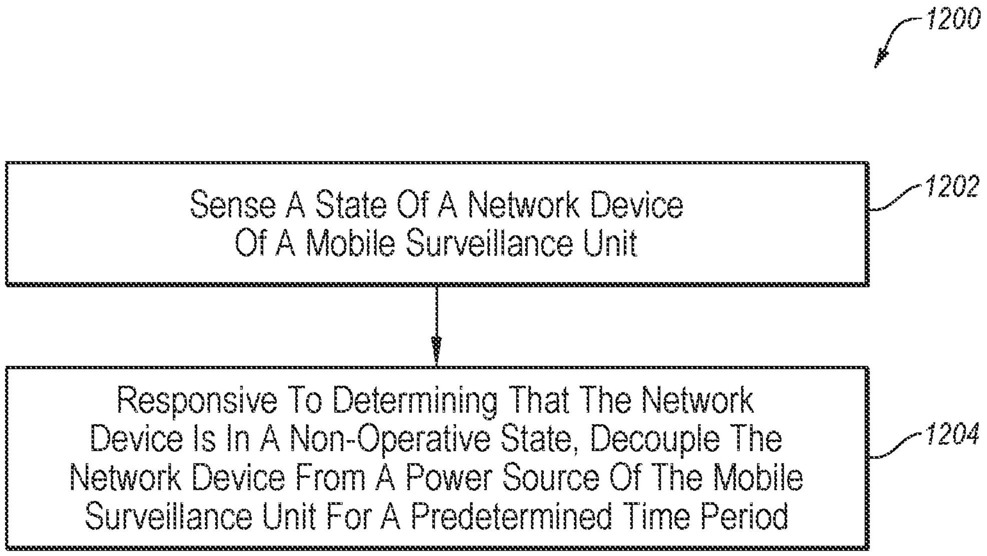
FIG. 12 is a flowchart illustrating an example method of operating a mobile unit, according to various embodiments of the disclosure.

FIG. 12 is a flowchart of an example method 1200 of operating a mobile surveillance unit, according to various embodiments of the disclosure. More specifically, for example, method 1200 may be related to resetting at least one device of a mobile surveillance unit. Method 1200 may be arranged in accordance with at least one embodiment described in the disclosure. Method 1200 may be performed, in some embodiments, by a device or system, such as system 100 of FIG. 1, system 300 of FIG. 3, system 400 of FIG. 4, system 500 of FIG. 5A, system 550 of FIG. 5B, system 600 of FIG. 6, system 700 of FIG. 7, and/or system 800 of FIG. 8, or another device or system. Although illustrated as discrete blocks, various blocks may be divided into additional blocks, combined into fewer blocks, or eliminated, depending on the desired implementation.

Method 1200 may begin at block 1202, wherein a state of a network device of the mobile surveillance unit is sensed, and method 1200 may proceed to block 1204. For example, the state of the network device may be sensed via a controller of the mobile surveillance unit (e.g., unit 102 of FIG. 1). More specifically, for example, a signal may be sent to the network device (e.g., from the controller), and the state of the network device may be determined based on a received signal from the network device or the lack thereof. Yet more specifically, if a return signal (i.e., a signal from the network device is not received (e.g., at the controller) after sending a signal to the network device, it may be determined that that network device is in a non-operative state (e.g., the network device has hung, froze, crashed, etc.). For example, the network device may include a communication device (e.g., a network switch, an I/O device (e.g., a remote I/O device), a converter (e.g., an Ethernet to Serial Converter) or a power generator (e.g., a fuel cell generator).

At block 1204, responsive to determining that the network device is in a non-operative state, the network device may be decoupled from a power source of the mobile surveillance unit for a period of time. For example, the network device may be decoupled from the power source via a normally closed relay. More specifically, a coil of the normally closed relay may be activated to open a switch of the normally closed relay, as will be appreciated by a person having ordinary skill. In at least some examples, an I/O device (e.g., a remote I/O device) may convey a signal to the relay to decouple the network device from the power source. Further, for example, the network device may be recoupled to the power source after the time period, which may be a predetermined time period (e.g., the network device may automatically reconnect to the at least one power source after expiration of the time period (e.g., 2 seconds, 3, seconds, 4 seconds, 10 seconds, without limitation), which may be predetermined based on one or more circuit values of associated circuitry (e.g., circuitry 306 of FIG. 3 and/or relay 704 of FIG. 7).

Modifications, additions, or omissions may be made to method 1200 without departing from the scope of the present disclosure. For example, the operations of method 1200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As will be appreciated by persons having ordinary skill in the art, in contrast to conventional systems, devices, circuitry, and methods, which require a user to travel to a remote location of a mobile unit to manually reset a device of the mobile unit, various embodiments may enable a user to remotely reset a device (e.g., a communication device or a generator of a mobile unit). Thus, as will be appreciated by a person having ordinary skill in the art, various embodiments may save time and may reduce costs associated with the mobile unit. Further, various embodiments may increase uptime of a remote unit.

In accordance with common practice, the various features illustrated in the drawings may not be drawn to scale. The illustrations presented in the disclosure are not meant to be actual views of any particular apparatus (e.g., circuit, device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., circuit, device, or system) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

As used herein, the term "approximately" or the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, the term "approximately" or the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A system including a mobile surveillance unit, the system comprising:

a mobile surveillance unit comprising:

a power source;

a relay coupled to the power source, the relay comprising a time-delay-off relay;

a network including a network device and an input/output (I/O) device, each of the network device and the I/O device coupled to the relay; and a controller coupled to the network and configured to:

determine whether the at least one network device is in a non-operative state; and responsive to determining that the network device is in the non-operative state, convey a first signal to the I/O device;

wherein the I/O device is configured to, responsive to receipt of the first signal from the controller, convey a second signal to the relay; and wherein the relay is configured to, responsive to receipt of the second signal from the I/O device:

decouple each of the network device and the I/O device from the power source;

remain activated for a predetermined time period after the I/O device is decoupled from the power source; and upon expiration of the predetermined time period, recouple each of the network device and the I/O device to the power source.

2. The system of claim 1, wherein the controller is configured to send at least one signal to the network device to determine a state of the network device.

3. The system of claim 1, wherein the network device comprises a communication device.

4. The system of claim 3, wherein the communication device comprises at least one of a network switch or a converter.

5. The system of claim 1, wherein the network device comprises a fuel cell generator.

6. A method of operating a mobile surveillance unit, the method comprising:

sensing, via a controller of a mobile surveillance unit, a state of a network device of the mobile surveillance unit; and responsive to determining that the network device is in a non-operative state, conveying, from the controller to an input/output (I/O) device of the mobile surveillance unit, a first signal;

responsive to receipt of the first signal at the I/O device, conveying, from the I/O device to a time-delay-off relay, a second signal;

responsive to receipt of the second signal at the time-delay-off relay, decoupling, via the time-delay-off relay, each of the network device and the I/O device from a power source of the mobile surveillance unit;

maintaining the time-delay-off relay in an activated state for a predetermined time period after the I/O device is decoupled from the power source; and upon expiration of the predetermined time period, recoupling, via the time-delay-off relay, each of the network device and the I/O device to the power source.

7. The method of claim 6, wherein sensing comprises:
sending a signal to the network device; and
determining the state of the network device based on a received signal from the network device or a lack thereof.

8. The method of claim 6, wherein decoupling comprises activating a coil of the time-delay-off relay to open a switch of the time-delay-off relay.

9. The method of claim 6, wherein sensing the state of the network device comprises sensing a state of at least one of a fuel cell generator, a network switch, or a converter.

10. The method of claim 6, wherein decoupling comprises opening a switch of the time-delay-off relay coupled between the power source and the network device.

11. A mobile surveillance unit, comprising:
a trailer;
a power source coupled to the trailer;
a relay coupled to the power source, the relay comprising a time-delay-off relay;
a network including a network device and an input/output (I/O) device, each of the network device and the I/O device coupled to the relay; and
a controller coupled to the network and configured to:
determine a state of the network device; and
responsive to determining that the network device of is in a failed state, convey a first signal to the I/O device;
wherein the I/O device is configured, responsive to receipt of the first signal from the controller, to convey a second signal to the relay; and
wherein the relay is configured, responsive to receipt of the second signal from the I/O device, to:
cause a switch of the relay to open such that each of the network device and the I/O device is decoupled from the power source;
maintain the switch in the open state for a predetermined time period after the I/O device is decoupled from the power source; and
upon expiration of the predetermined time period, cause the switch to close such that each of the network device and the I/O device is recoupled to the power source.

12. The mobile surveillance unit of claim 11, wherein the power source includes at least one battery.

13. The mobile surveillance unit of claim 12, further comprising:
a storage box coupled to the trailer and including the power source and the network device;
a mast coupled to the trailer and having a first end proximate the storage box; and
a head unit coupled to a second end of the mast and including the controller.

14. The mobile surveillance unit of claim 11, wherein the relay comprises a normally closed relay.

15. The mobile surveillance unit of claim 11, wherein the input/output (I/O) device is configured to remain unpowered during the predetermined time period.

* * * * *